United States Patent Office 3,799,966
Patented Mar. 26, 1974

3,799,966
DI-(2-PHENOXYETHYL) PEROXYDICARBONATE
Jose Sanchez, Grand Island, N.Y., assignor to Pennwalt
Corporation, Philadelphia, Pa.
No Drawing. Filed Dec. 17, 1971, Ser. No. 209,435
Int. Cl. C07c 73/10; C08f 1/60
U.S. Cl. 260—463       1 Claim

ABSTRACT OF THE DISCLOSURE

Di-(2-phenoxyethyl) peroxydicarbonate and improved processes employing same as initiators for the polymerization of ethylenically unsaturated monomers (such as vinyl chloride) and as curing catalysts for curing unsaturated polyester resin compositions.

BACKGROUND OF THE INVENTION (a) Field of invention

This invention relates to novel di-(2-phenoxyethyl) peroxydicarbonate (1),

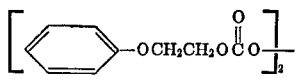   (1)

a peroxydicarbonate of unusually high thermal stability which can be transported and stored nonrefrigerated, and to its use as a free-radical initiator in polymerizations of ethylenically unsaturated monomers and as a curing catalyst for unsaturated polyester resins.

Dialkyl peroxydicarbonates are low temperature free-radical polymerization initiators (and curing agents) which are displacing the well-known dilauroyl peroxide in vinyl chloride polymerizations owing to the superior efficiencies of these initiators. The switch to the lower temperature dialkyl peroxydicarbonates from dilauroyl peroxide was not made without problems, however. Dialkyl peroxydicarbonates such as the commercially available IPP (diisopropyl peroxydicarbonate) have stringent refrigerated storage and shipping requirements which are designed to maintain assay and prevent explosive decompositions upon inadvertent warming. On the other hand, dilauroyl peroxide does not require refrigeration during storage and shipping. Numerous domestic as well as foreign PVC[poly(vinylchloride)] manufacturers would like to switch from dilauroyl peroxide to the more efficient dialkyl peroxydicarbonates; however, a number of reasons prevent them from doing so. Some domestic PVC producers are not along the routes used by peroxide producers to supply their customers via refrigerated trucks; hence, refrigerated shipments of dialkyl peroxydicarbonates are not frequent. This means that these producers have to keep large amounts of dialkyl peroxydicarbonates on hand and must receive large shipments of these peroxydicarbonates in order to make it worthwhile (economically) for the peroxide produced to ship to them. Hence, the PVC producers who art not on the refrigerated truck routes must either maintain large and costly refrigerated storage facilities for peroxydicarbonates or they have to use less efficient but more stable dilauroyl peroxide. Another reason that some domestic PVC producers give for not using peroxydicarbonates is the hazard that results from accidental warming to ambient temperatures. IPP will detonate after warming to room temperature. Many foreign PVC producers or potential PVC producers would like to use the more efficient dialkyl peroxydicarbonates for commercial vinyl chloride polymerizations; however, many of these PVC producers are located in countries which do not have manufacturers of dialkyl peroxydicarbonates or of alkyl chloroformates (precursors to peroxydicarbonates) or of phosgene (used to make alkyl chloroformates). This is especially true of PVC producers or potential PVC producers who are located in some of the developing countries of the world such as India, the countries of Southeast Asia, Africa, and Central and South Americas and the Arab nations. Almost all of the developing countries are in the subtropical to tropical areas of the world; hence, ambient temperatures over 100° F. would not be uncommon. Refrigerated shipment of peroxydicarbonates from producers in the United States or Europe to PVC producers in these developing nations by sea or other carrier would be out of the question owing to the cost of the refrigerated shipment and cost of refrigerated storage to the PVC producer. Hence, there is a need for a dialkyl peroxydicarbonate which can be shipped and stored without refrigeration and one which would survive the highest ambient temperatures which would be encountered without decomposing violently and without losing assay during non-refrigerated transport and storage. Dialkyl peroxydicarbonates which could be useful would, at times, be subjected to temperatures of 50° C. (122° F.) and possibly even 60° C. (140° F.) for short periods of time. Hence, the desired dialkyl peroxydicarbonate would have to survive under these conditions. One peroxide producer determines whether or not a peroxide can be shipped and stored non-refrigerated by testing its thermal stability at 50° C. for one week. If it does not decompose violently during this test, it can be shipped and stored without need of refrigeration. The peroxide producers prefer that the peroxide tested would survive for at least 24 hours at a higher temperature and/or for a longer period of time at 50° C. since this would result in a greater margin of safety. One thermal stability test which could be run on prospective stable peroxydicarbonates would be a 60° C./1. day thermal stability test. Since dialkyl peroxydicarbonates usually have 10 hour half-lives (in a solvent) at about 40 to 50° C., one would not expect them to survive long at 50° C. and certainly not long at 60° C. In the art, there are many dialkyl peroxydicarbonates which are stable at room temperature (20° C. to 30° C.). However, all of these must be shipped and stored refrigerated owing to the high temperatures encountered during shipping and storage.

(b) Related art

Strain [U.S. Pat. No. 2,370,588 and J. Am. Chem. Soc., 72, 1254 (1950)] discloses the preparations of various dialkyl peroxydicarbonates, including commercially available and hazardous peroxydicarbonates such as IPP. Among those listed is dibenzyl peroxydicarbonate (2)

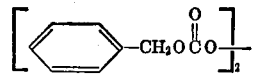   (2)

a solid (melting point 101–102° C.), which is shown below to be thermally stable at 40° C. for 4 weeks (losing 1.1% of its assay). Samples of (2), however, were found to lose 14.3% of their assay after one week at 50° C. and 98.1% after two weeks at 50° C. When tested at 60° C., a sample decomposed with force shortly after 5 hours.

Several other room temperature stable peroxydicarbonates are disclosed. For example, U.S. Pat. No. 3,499,-919 discloses 4-substituted dicyclohexyl peroxydicarbonates (3)

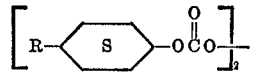   (3)

such as di-(4-t-butylcyclohexyl) peroxydicarbonate; Netherlands application 6,917,105 discloses di(hexadecyl) peroxydicarbonate; German OLS 2,034,922 discloses di- (cis-3,3,5-trimethylcyclohexyl) peroxydicarbonate; and German OLS 2,034,964 discloses various solid di(bicycloalkyl) peroxydicarbonates such as diisobornyl peroxydicarbonate. As shown below, these compounds are also unstable at temperatures of 35–50° C.

German OLS 1,957,386 claims room temperature stable peroxydicarbonates of general structure (4):

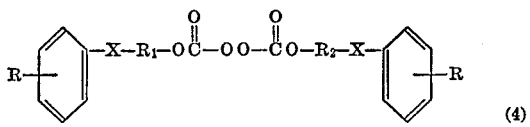

where R is alkyl or halogen, X is oxygen, and $R_1$ and $R_2$ are alkyl groups which can be interrupted with oxygen atoms, and discloses di-(3-phenoxypropyl) peroxydicarbonate (5):

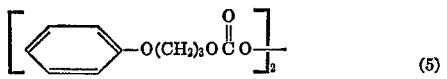

which is shown below to decompose violently after 8 hours at 50° C.

BRIEF SUMMARY OF THE INVENTION

This invention concerns:
(A) Novel di-(2-phenoxyethyl) peroxydicarbonate, a usually safe and stable peroxydicarbonate; and
(B) Improved processes for
   (1) polymerizing ethylenically unsaturated monomers which are responsive at suitable temperatures to initiating amounts of free radical polymerization initiators, and
   (2) curing unsaturated polyester resin compositions by heating in the presence of initiating amounts of free radical curing catalysts,
the improvement residing in the use of di-(2-phenoxyethyl) peroxydicarbonate as said initiator or curing catalyst.

DETAILED DESRIPTION OF INVENTION

Dialkyl peroxydicarbonates normally have 10-hour half-lives (in a solvent) at about 40–50° C. and accordingly are not expected to survive long at 50° C. or higher. This is borne out by the fact that dialkyl peroxydicarbonates heretofore disclosed are stable at room temperature but unstable at 50°–60° C.

Nevertheless, it has now been discovered that di(2-phenoxyethyl) peroxydicarbonate not only passes the 50° C. test with little or no loss of assay, but also only loses 3% of its assay after 24 hours at 60° C. Thus a peroxydicarbonate has now been found which can be transported and stored under almost any temperature condition without need of refrigeration.

Polymerization

In the free radical initated polymerization of ethylenically unsaturated monomers at suitable temperatures, the subject peroxydicarbonate is also found to be highly efficient. In fact, it is found to be more than seven times as efficient as lauroyl peroxide (an industry standard) on a molar basis in the polymerization of vinyl chloride, and more efficient on both molar and weight bases than dibenzyl peroxydicarbonate (currently being promoted as a replacement for lauroyl peroxide), even though di-(2-phenoxyethyl) peroxydicarbonate has a higher molecular weight than dibenzyl peroxydicarbonate.

Suitable monomers include olefins such as ethylene, propylene, styrene, chlorostyrene, vinyltoluene, vinylpyridine, divinylbenzene and alphamethylstyrene; conjugated olefins such as 1,3-butadiene, isoprene and chloroprene; vinyl esters such as vinyl acetate, vinyl propionate, vinyl laurate, vinyl benzoate and divinyl carbonate; allyl esters such as allyl acetate, diallyl carbonate, allyl benzoate and diallyl phthalate; unsaturated conjugated nitriles such as acrylonitrile and methacrylonitrile; acrylic acid and methacrylic acid and their esters and amides such as methyl, n-butyl and 2-ethylhexyl acrylates and methacrylates and acrylamide and methacrylamide; maleic anhydride; maleic acid and fumaric acid and their esters; vinyl halo and vinylidene halo compounds such as vinyl chloride, vinyl bromide, vinyl fluoride, vinylidene chloride and vinylidene fluoride; perhalo olefins such as tetrafluoroethylene, hexafluoropropylene and chlorotrifluoroethylene; vinyl ethers such as methyl vinyl ether and n-butyl vinyl ether; acrolein; and mixtures thereof. A preferred monomer is vinyl chloride.

Temperatures of about 0°–150° C. (preferably 35°–75° C.) and peroxide levels of about 0.003–0.300% or more (preferably 0.01–0.20%) by weight, based on the polymerizable monomer, are normally employed in these processes. Conventional solvents can optionally be added to the reaction system.

Curing of polyester resins

In curing unsaturated polyester resin compositions by heating at suitable curing temperatures in the presence of free radical curing catalysts, the use of di-(2-phenoxyethyl) peroxydicarbonate is found to have a greater activity (result in faster cures) than dibenzoyl peroxide (a commercially available low temperature curing catalyst).

Unsaturated polyester resins curable by the invention peroxide normally consist of an unsaturated polyester and a polymerizable monomer.

The unsaturated polyester component is normally obtained by the esterification of one or more ethylenically unsaturated di- or polycarboxylic acids or their anhydrides, such as maleic acid, fumaric acid, glutaconic acid, itaconic acid, mesaconic acid, citraconic acid, allylmalonic acid, allylsuccinic acid, and others, with saturated or unsaturated polyalcohols such as ethylene glycol, diethylene glycol, triethylene glycol, 1,2-propanediol, 1,3-propanediol, 1,2-butanediol, 1,4-butanediol, 2,2-dimethyl-1,3-propanediol, 2-buten-1,4-diol, 2-butyn-1,4-diol, glycerol, 2,2,4-trimethyl-1,3-pentanediol, 2,2,4,4 - tetramethyl-1,3-cyclobutanediol, 1,4-di(hydroxymethyl)cyclohexane, 1,2,5-hexanetriol, pentaerythritol, mannitol and others. Mixtures of such acids and/or alcohols may also be used. The unsaturated di- or polycarboxylic acids may be replaced, at least partly, by saturated, carboxylic acids such as adipic acid, succinic acid, sebacic acid and others, or by aromatic dicarboxylic acids, such as phthalic acid, tetrahydrophthalic acid, and others and their anhydrides such as phthalic anhydride. The acids used as well as the alcohols employed may be substituted by halogen or other substituents, preferably by halogen. Examples of such suitable halogenated acids are, for instance, tetrachlorophthalic acid, 1,4,5,6,7,7-hexachloro-2,3-dicarboxybicyclo (2.2.1)-5-heptene, and others, or their anhydrides.

The other component of the unsaturated polyester resin compositions is an ethylenically unsaturated monomer, preferably ethylenically unsaturated monomers such as styrene, chlorostyrene, vinyltoluene, methyl methacrylate, diallyl phthalate, dibutyl fumarate, acrylonitrile, triallyl cyanurate, α-methylstyrene, divinylbenzene, methyl acrylate, diallyl maleate, ethyl methacrylate, ethyl acrylate and others, which are copolymerizable with said unsaturated polyesters.

A preferred resin composition contains as the polyester component the esterification product of propylene glycol (a polyalcohol), maleic anhydride (an anhydride of an unsaturated dicarboxylic acid) and phthalic anhydride (an anhydride of an aromatic dicarboxylic acid) and as the monomer component styrene.

Temperatures of from about 20° C. to about 170° C. (preferably 50° C. to 150° C.) and peroxide levels of from about 0.05% to about 5.0% or more (preferably 0.2% to 2.5%) by weight of curable unsaturated polyester resin are normally employed.

EXAMPLES

The following examples illustrate the subject invention, but are not in limitation thereof.

EXAMPLE I

Preparation of di-(2-phenoxyethyl) peroxydicarbonate (1)

2-phenoxyethyl chloroformate was prepared in 98.2% assay and 92.8% corrected yield by reacting 0.35 mole of 2-phenoxyethanol with 0.65 mole of phosgene followed by removal of excess phosgene.

A jacketed reactor equipped with a mechanical stirrer, a thermometer and an addition funnel was charged with 60 g. of water and two drops of polyethoxylated nonylphenol (surfactant) and the resulting solution was cooled to 0° C. To it was added 52.0 g. (0.26 mole) of 20% aqueous sodium hydroxide solution followed by dropwise addition of 8.85 g. (0.13 mole) of $H_2O_2$ (50%). To this vigorously stirred solution at 5° C. to 10° C. was slowly added a solution of 49.0 g. (0.245 mole) of 2-phenoxyethyl chloroformate (98.2%) in 75 ml. of methylene chloride over a 40 minute period. The reaction mixture was then stirred for 3 hours at 10° C. to 15° C. To the mixture was added 150 ml. of methylene chloride in order to completely dissolve the product. After separation of the aqueous layer the methylene chloride solution was washed with 40 ml. of 10% aqueous sodium hydroxide solution and then with water to neutral. The resulting solution was dried over anhydrous $MgSO_4$ and, after separation of the used desiccant, the methylene chloride was removed in vacuo. The solid product which remained was stirred with cold diethyl ether and after filtration 37.2 g. of white solid, M.P. 97–100° C., was obtained. The assay of the product according to "active oxygen" content was 99.5%, hence the corrected yield was 85.2%.

EXAMPLE IIA

Thermal stabilities of di-(2-phenoxyethyl) peroxydicarbonate and di-(3-phenoxypropyl) peroxydicarbonate Using the method employed in Example I di-(3-phenoxypropyl) peroxydicarbonate was prepared with an assay of 92.7% and in a corrected yield of 92.0%. This material was stirred with cold diethyl ether and the solid was separated by filtration. The product had a melting point of 51°–53° C. and had an assay of 98.4% according to "active oxygen" content.

Thermal stability test at 50° C. and 60° C.

In one test 15 g. samples of di-(2-phenoxyethyl) peroxydicarbonate (99.5% assay) and of di-(3-phenoxypropyl) peroxydicarbonate (98.4% assay) were placed in an oven which was maintained at 50° C. The test was stopped if the peroxide decomposed vigorously, otherwise, it was continued and the assay loss was determined after various time intervals. The results are summarized in Example IIA Table and show that di-(2-phenoxyethyl) peroxydicarbonate is unexpectedly more

EXAMPLE IIA TABLE.—THERMAL STABILITIES AT 50° C.

| Peroxydicarbonate | Vigorous decomposition | Total assay/ loss after |
|---|---|---|
| Di-(2-phenoxyethyl) | No | 1.0%/1 week. |
| Do | No | 1.0%/2 weeks. |
| Do | No | 1.0%/4 weeks. |
| Di-(3-phenoxypropyl) | Yes | 100%/8 hours. | stable than the di-(3-phenoxypropyl) peroxydicarbonate disclosed in German OLS 1,957,386. The reason that this result is surprising is that peroxydicarbonates as a class have 10 hour half-lives at about 40° C. to 50° C. Hence, it is not surprising that di-(3-phenoxypropyl) peroxydicarbonate should decompose vigorously and completely after 8 hours at 50° C. On the other hand it is unexpected that di-(2-phenoxyethyl) peroxydicarbonate should survive at 50° C. for 4 weeks without decomposing vigorously and that it should lose only 1.0% of its assay after 4 weeks at 50° C.

The slight difference in the assays is not responsible for the observed greater stability of di-(2-phenoxyethyl) peroxydicarbonate over di-(3-phenoxypropyl) peroxydicarbonate since the assay of di-(2-phenoxyethyl) peroxydicarbonate, after one week at 50° C., was about the same as that of di-(3-phenoxypropyl) peroxydicarbonate and it did not decompose or lose any further assay during the next three weeks.

In the other test 15 g. of di-(2-phenoxyethyl) peroxydicarbonate (99% assay) was placed in an oven at 60° C. for 24 hours and the assay was determined. It lost only 3% of its assay. Di-(3-phenoxypropyl) peroxydicarbonate was not tested in this way since its behavior at 50° C./8 hours would suggest that it would decompose violently after a short period of time at 60° C.

Hence, these results show that di-(2-phenoxyethyl) peroxydicarbonate the peroxide of this invention, has thermal stability of about 15° C. higher than that of di-(3-phenoxypropyl) peroxydicarbonate.

EXAMPLE IIB

Thermal stabilities of di-(2-phenoxyethyl) peroxydicarbonate (1) and di-(1-phenoxy-2-propyl) peroxydicarbonate (6)

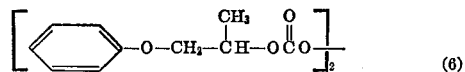

(6)

Using the process employed in Example I di-(1-phenoxy-2-propyl) peroxydicarbonate was prepared. After one recrystallization of the crude product from diethyl ether the product, a solid, M.P. 71–75° C., was obtained in 51.0% corrected yield. The assay was 98.0%.

In the thermal stability tests at 50° C. 15 g. samples of di-(2-phenoxyethyl) peroxydicarbonate (99.5% assay) and di-(1-phenoxy-2-propyl)peroxydicarbonate (98.0% assay) were placed in an oven which was held at 50° C. Individual tests were stopped if the peroxide decomposed vigorously, hence the assay loss was considered to be 100%. When the peroxide did not decompose vigorously the assay loss was determined after various time intervals. The results are summarized in Example IIB Table and show that di-(2-phenoxyethyl) peroxydicarbonate, the invention peroxide, is unexpectedly more stable than is di-(1-phenoxy-2-propyl) peroxydicarbonate, a peroxy dicarbonate which is structurally similar to di-(2-phenoxyethyl) peroxydicarbonate.

EXAMPLE IIB TABLE.—THERMAL STABILITIES AT 50° C.

| Peroxydicarbonate | Vigorous decomp. | Test duration | Total assay loss, percent |
|---|---|---|---|
| Di-(2-phenoxyethyl) | No | 1 week | 1.0 |
| Do | No | 2 weeks | 1.0 |
| Do | No | 4 weeks | 1.0 |
| Di-(1-phenoxy-2-propyl) | Yes | Less than 2 days | 100 |

EXAMPLE III

The thermal stabilities of known solid peroxydicarbonates compared to that of di-(2-phenoxyethyl) peroxydicarbonate Samples of solid peroxydicarbonates such as dibenzyl peroxydicarbonate (U.S. 2,370,588), di-(4-t-butylcyclohexyl) peroxydicarbonate (U.S. 3,499,919), di(hexadecyl) peroxydicarbonate (Dutch application 6,917,105), di-(cis - 3,3,5 - trimethylcyclohexyl) peroxydicarbonate (German OLS 2,034,922), diisobornyl peroxydicarbonate (German OLS 2,034,964) and di-(2-phenoxyethyl) peroxydicarbonate were thermal stability tested at various temperatures. Samples of each were placed in ovens held at the desired temperatures and the assay losses after various intervals of time were determined. These results along with the results from Example IIA are summarized in Example III table. These results show that di-(2- phenoxyethyl) peroxydicarbonate, the peroxide of this invention, has much greater thermal stability than any of the known solid peroxydicarbonates. The high thermal stability of di-(2-phenoxyethyl) peroxydicarbonate means that the pure peroxide can be shipped and stored non-refrigerated and will survive without decomposing or losing significant assay for long periods of time at 50° C. (122° F.) and will survive without decomposing violently for short periods of time at 60° C. (140° F.). No known peroxydicarbonate has thermal stability as great as di-(2-phenoxyethyl) peroxydicarbonate. Its high thermal stability puts it in a class by itself since it can be stored and transported without need of refrigeration, whereas, the others as pure peroxydicarbonates must be refrigerated. While the other so-called stable peroxydicarbonates are stable at room temperature, (1) is room temperature stable as well as stable at the highest ambient temperatures which may occur during transport and storage (50° C. to 60° C.).

EXAMPLE III TABLE.—THERMAL STABILITY TESTS ON SOLID PEROXYDICARBONATES

| Peroxydicarbonate | Temp./duration | Percent of assay lost |
| --- | --- | --- |
| Dibenzyl | 30° C./4 weeks | 0.0 |
| Do | 40° C./4 weeks | 1.1 |
| Do | 50° C./1 week | 14.3 |
| Do | 50° C./2 weeks | 98.1 |
| Do | 60° C./5 hours | [1] 100 |
| Di(4-t-butylcyclohexyl) | 30° C./4 weeks | 0.0 |
| Do | 40° C./4 weeks | 96.0 |
| Di(hexadecyl) | 30° C./4 weeks | 0.0 |
| Do | 40° C./1 week | 4.0 |
| Di-(cis-3,3,5-trimethyl-cyclohexyl) | 30° C./4 weeks | 4.5 |
| Do | 35° C./4 weeks | 83.0 |
| Diisobornyl | 40° C./4 weeks | 2.9 |
| Di-(2-phenoxyethyl) | 30° C./4 weeks | 0.0 |
| Do | 40° C./5 weeks | 0.0 |
| Do | 50° C./4 weeks | 1.0 |
| Do | 60° C./1 day | 3.0 |
| Di(3-phenoxypropyl) | 50° C./8 hours | [1] 100 |

[1] (Decomposed with force).

EXAMPLE IV

Safety tests on dibenzyl peroxydicarbonate and di-(2-phenoxyethyl) peroxydicarbonate Owing to the fact that dibenzyl peroxydicarbonate is being commercialized as the most thermally stable peroxydicarbonate up to this time, it and di-(2-phenoxyethyl) peroxydicarbonate, the peroxide of this invention, were subjected to various safety tests which are well known (see J. Varjavandi and O. L. Mageli: "Safe Handling of Organic Peroxides," J. Chem. Ed., 48, A451 (1971), which is incorporated herein by reference). The results of these tests are summarized in Example IV Table

EXAMPLE IV TABLE.—SAFETY TESTS

| | Peroxydicarbonate | |
| --- | --- | --- |
| Test | Di-(2-phenoxyethyl) | Dibenzyl |
| Shock sensitivity [1] | Negative at 15 inches | Positive at 7 inches. |
| Rapid heat [2] | Mild explosion at 94° C. | Mild explosion at 90° C. |
| Pressure vessel test [3] | 1.5 mm | 7.8 mm. |
| Trauzl [4] | 15.5 ml | 18.5 ml. |

[1] Tests sensitivity of peroxide to initiation by shock or impact.
[2] Tests sensitivity to decomposition under rapid heating.
[3] Compares rate and energy of thermal decomposition under rapid heat and partial confinement.
[4] Measures total decomposition force by expansion of a cavity in a lead block, and show that di-(2-phenoxyethyl) peroxydicarbonate, in every case, is a safer peroxydicarbonate than is dibenzyl peroxydicarbonate.

EXAMPLE V

Vinyl chloride polymerization efficiencies of dibenzyl peroxydicarbonate, dilauroyl peroxide and di-(2-phenoxyethyl) peroxydicarbonate at 50° C./8 hrs.

Dibenzyl peroxydicarbonate is being promoted as a thermally stable peroxydicarbonate replacement for dilauroyl peroxide in vinyl chloride polymerizations owing to its greater efficiency than that of dilauroyl peroxide, a standard peroxide used commercially in vinyl chloride polymerizations. Vinyl chloride suspension polymerizations were run at 50° C. for 8 hours in order to determine the amounts of dibenzyl peroxydicarbonate, dilauroyl peroxide and di-(2-phenoxyethyl) peroxydicarbonate, the invention peroxide, required at 90% conversion of vinyl chloride. The following recipe was employed in these polymerizations:

| Ingredient: | Parts by weight |
| --- | --- |
| Vinyl chloride monomer | 100 |
| Water (triple distilled) | 130 |
| Methocel [1] (65 HG, 50 cps.) (1% aqueous soln.) | 60 |
| Aerosol MA [2] (1% aqueous soln.) | 60 |
| Free-radical initiator | variable |

[1] Methylcellulose (Dow Chemical Co.)
[2] Sodium salt of dihexyl sulfosuccinate (American Cyanamid Co.).

Procedure

Pop bottles were employed. Water, aqueous Methocel and aqueous Aerosol MA were added to each bottle and the contents were frozen at —20° C. To the bottles were then added varying amounts of free-radical initiators (several bottles for each initiator) and the required amount of liquid vinyl chloride monomer (at —14° C.). The bottles were crown-capped, enclosed in safety cages and placed in a constant temperature bottle polymerizer maintained at 50° C. End-over-end tumbling at a rate of 25 revolutions per minute was employed for agitation and the polymerizations were allowed to proceed for 8 hours. At the end of that time the bottles were removed from the bottle polymerizer, cooled to 0° C. and vented of vinyl chloride monomer. Venting of unreacted vinyl chloride monomer seldom took more than 15 to 30 minutes; hence, post-polymerization was insignificant. The amount of polymer produced was determined gravimetrically (by difference in weight) and plots of initiator required versus percent conversion were constructed for each initiator and the amounts of initiators (in grams and in moles) required at 90% conversion were determined from the plots. These results are shown in Example V Table and show that di-(2-phenoxyethyl) peroxydicarbonate, the peroxide of this invention, is considerably more efficient that is dilauroyl peroxide and significantly more efficient than is dibenzyl peroxydicarbonate. Hence, di-(2-phenoxyethyl) peroxydicarbonate is not only safer and more thermally stable than dibenzyl peroxydicarbonate, it is more efficient in vinyl chloride polymerization.

EXAMPLE V TABLE
VCl susp. polym. at 50° C./8 hours

| | Initiator req./100 g. VCl at 90% conv. | |
| --- | --- | --- |
| Initiator | Grams | Mole×10⁻⁴ |
| Dilauroyl peroxide | 0.5500 | 13.81 |
| Dibenzyl peroxydicarbonate | 0.0770 | 2.55 |
| Di-(2-phenoxyethyl) peroxydicarbonate | 0.0685 | 1.89 |

EXAMPLE VI

100° C. SPI exotherms of di-(2-phenoxyethyl) peroxydicarbonate

The unsaturated polyester resin employed in this example was a mixture of an unsaturated polyester and styrene monomer.

The unsaturated polyester was an alkyd resin made by esterifying the following components:

| Component: | Quantity, moles |
| --- | --- |
| Maleic anhydride | 1.0 |
| Phthalic anhydride | 1.0 |
| Propylene glycol | 2.2 |

To the resulting resin was added 0.013% by weight of hydroquinone inhibitor. The alkyd resin had an Acid No. of 45–50. Seven (7) parts by weight of the above polyester (alkyd resin) was diluted with three (3) parts by weight of monomeric styrene. The resulting unsaturated polyester resin had the following properties:

(a) Viscosity (Brookfield No. 2 at 20 r.p.m.): 13.08 poise.
(b) Specific gravity: 1.14.

Curing procedure

Gelation and cure characteristics of di-(2-phenoxyethyl) peroxydicarbonate in the unsaturated polyester resin described above were determined using the "Standard SPI Exotherm Procedure for Running Exotherm Curves—Polyester Resin," published in the preprint of the 16th Annual Conference—Reinforced Plastics Division, Society of the Plastic Industry, Inc. (Februray 1961).

Using this procedure, di-(2-phenoxyethyl) peroxydicarbonate, the peroxide of this invention, was evaluated as a curing catalyst for the unsaturated polyester resin at 100° C. The level of catalyst employed was that which was equal in active oxygen to 1% by weight of dibenzoyl peroxide (a commercially available low temperature curing catalyst). The results are summarized below in Example VI Table.

EXAMPLE VI TABLE

100° SPI exotherms of di-(2-phenoxyethyl) peroxydicarbonate

| Peroxide | Gel, min. | Cure, min. | Peak, °F. | Barcol |
|---|---|---|---|---|
| Di-(2-phenoxyethyl) peroxydicarbonate | 0.3 | 1.3 | 375 | 25–30 |
| Dibenzoyl peroxide | 1.8 | 2.7 | 425 | 45 |

These results show that di-(2-phenoxyethyl) peroxydicarbonate has greater activity than dibenzoyl peroxide in curing the resin.

What is claimed is:
1. Di-(2-phenoxyethyl) peroxydicarbonate.

References Cited

FOREIGN PATENTS 1,957,386  7/1970  Germany.

OTHER REFERENCES

Chemical Abstracts, vol. 64, 5271b (1966).

LEWIS GOTTS, Primary Examiner

D. G. RIVERS, Assistant Examiner

U.S. Cl. X.R.

260—77.5 UA, 88.7 D, 89.3, 89.5 A, 91.1 R, 92.3, 92.8 W, 94.2 R, 94.9 A, 861